No. 692,384. Patented Feb. 4, 1902.
T. D. TAYLOR.
DEPOSIT CREDIT BOOK.
(Application filed Aug. 20, 1901.)

(No Model.) 2 Sheets—Sheet 1.

FIG. 1.

WITNESSES.
Charles T. Hannigan
Frank A. Crowell

INVENTOR.
Thomas D. Taylor
By Horatio E. Bellows
Atty.

No. 692,384. T. D. TAYLOR. Patented Feb. 4, 1902.
DEPOSIT CREDIT BOOK.
(Application filed Aug. 20, 1901.)

(No Model.) 2 Sheets—Sheet 2.

FIG. 2.

UNITED STATES PATENT OFFICE.

THOMAS D. TAYLOR, OF PROVIDENCE, RHODE ISLAND.

DEPOSIT-CREDIT BOOK.

SPECIFICATION forming part of Letters Patent No. 692,384, dated February 4, 1902.

Application filed August 20, 1901. Serial No. 72,704. (No model.)

*To all whom it may concern:*

Be it known that I, THOMAS D. TAYLOR, a citizen of the United States, residing at Providence, in the county of Providence and State of Rhode Island, have invented certain new and useful Improvements in Deposit-Credit Books, of which the following is a specification, reference being had therein to the accompanying drawings.

My invention relates to books employed to secure safety in commercial transactions, and has for its purpose the utilization of a bank-account or other credit balance to secure credit for an equal or lesser sum in merchandise elsewhere than at the place of deposit without withdrawing, in the first instance, any part of said bank-account and without interrupting the accumulation of interest upon the balance.

At present a savings-bank or "participation" depositor receives full interest or dividends only upon condition that no withdrawal be made prior to the usual dividend or interest period—that is, interest or dividends are allowed on the smallest amount continuously to the credit of the depositor during the entire dividend or interest period. Furthermore, a bank-balance cannot at present be utilized in credit transactions with merchants.

To the end of obtaining the advantages and avoiding the obstacles above enumerated my invention consists of the novel device hereinafter elaborated and illustrated by the drawings, wherein—

Figure 1 is a face view of my deposit-credit book, and Fig. 2 a similar view of a modified form of the same.

Similar reference-letters indicate like parts throughout the views.

My book consists of one or more pages A at the left and one or more pages B at the right of the binding C when the book is opened.

The page A is arranged with columns and headings common to an ordinary savings-bank deposit-book, except that two columns $a$ and $b$ are introduced, the former to receive the signature of the bank officer personally receiving the deposit at the bank or of the bank officer who represents the bank at the department store which acts as the bank, thereby guaranteeing the deposit on behalf of the bank represented. The column marked $b$ represents the net balance available for securing credit at any instant of time, said net balance being attained by the deduction from the cash balance $c$ of the balance due stores $d$, to be hereinafter detailed.

Page B is arranged for the record of purchases made by the depositor from the merchant, containing a "merchandise account," so called, which includes columns for the date of credit purchase $e$, amount of purchase $f$, time of credit $g$, and record of amount of payments $h$. A column $i$ shows what individual received payment on behalf of the merchant, and column $d$ indicates the total amount of credit at any time which the depositor is receiving from the merchant.

In practice the depositor or holder of the book showing an entry in column $c$ presents the same to a merchant from whom he desires to purchase an article, who enters the date of the credit purchase, amount of same, and days of credit under the appropriate heads in columns $e$, $f$, $g$, and $d$. As successive articles are bought, appropriate entries are similarly made beneath the first until the sum of the credits shown in column $d$ equal or nearly equal the amount shown in column $c$. The excess of the footing of column $c$ over column $d$ at any stated time may be entered in column $b$, which shows the amount of credit with which the depositor can trade. My book demands that this net balance $b$ only be subject to withdrawal from the bank by the depositor upon presentation of the book. Hence the security of the merchandise accounts cannot be impaired. It also provides that all amounts due on merchandise account, column $d$, shall be deducted from the cash balance, column $c$, if not paid within a stipulated number of days, and such matured claims are then paid to the merchant. If or when any amount charged in the merchandise account is paid, entry of such amount is made in column $h$ and deducted from the amount standing in column $d$.

The above description applies to the use of my book with one merchant only. I find a modification of the same convenient when accounts are run with more than one merchant. This modification consists in inserting in page B columns K and M, Fig. 2, the former indicating the date of cash payments and the latter showing the name of the creditor.

It is apparent that my invention will practically double the capital of the depositor by giving him the use of his money without disturbing his bank deposit or interfering with the accumulation of interest thereon. The merchant, on the other hand, has a perfect security and assurance of cash payment at the expiration of stipulated credit period, if not before, without communication with the depositor.

Having thus described my invention, what I claim as new, and desire to secure by Letters Patent, is—

A deposit-credit book having complementary pages, one of which constitutes a deposit-sheet and is provided with appropriately-headed spaces for data relating to deposits, one of said spaces being for entries of the cash balance and another for the available or net balance; the other of said pages constituting an account-sheet provided with appropriately-headed spaces for data relating to commercial transactions other than those with the bank, one of said spaces being for the credits received by the customer in such transactions.

In testimony whereof I have affixed my signature in presence of two witnesses.

THOMAS D. TAYLOR.

Witnesses:
ROBERT L. STANTON,
HORATIO E. BELLOWS.